(12) United States Patent
Lin et al.

(10) Patent No.: US 7,144,462 B2
(45) Date of Patent: Dec. 5, 2006

(54) ADJUSTABLE DETECTION APPARATUS

(75) Inventors: Shian-Jyh Lin, Chiayi Hsien (TW); Chun-Pin Li, Taipei (TW); Jung-Hsing Chien, Taoyuan (TW)

(73) Assignee: Nanya Technology Corporation, Taoyuan (TW)

( * ) Notice: Subject to any disclaimer, the term of this patent is extended or adjusted under 35 U.S.C. 154(b) by 304 days.

(21) Appl. No.: 10/417,529

(22) Filed: Apr. 17, 2003

(65) Prior Publication Data

US 2003/0200825 A1   Oct. 30, 2003

(30) Foreign Application Priority Data

Apr. 22, 2002   (TW) ............... 91108196 A

(51) Int. Cl.
 *B08B 7/04*   (2006.01)
(52) U.S. Cl. .............. 134/18; 134/184; 134/116; 422/100; 422/101; 414/331.01
(58) Field of Classification Search ............... 347/22; 422/99–100; 436/180; 134/18, 116, 184; 414/331.01

See application file for complete search history.

(56) References Cited

U.S. PATENT DOCUMENTS

| 3,976,028 A | * | 8/1976 | Howells et al. | 118/702 |
| 5,573,727 A | * | 11/1996 | Keefe | 422/63 |
| 5,742,302 A | * | 4/1998 | Kohri et al. | 347/23 |

\* cited by examiner

*Primary Examiner*—Jill Warden
*Assistant Examiner*—Jyoti Nagpaul
(74) *Attorney, Agent, or Firm*—Quintero Law Office

(57) ABSTRACT

An adjustable detection apparatus. The apparatus includes a first holding member and a second holding member and a detection device. The first holding member has a first sliding area, in which the second holding member is moveable. The second holding member has a second sliding area. The detection device comprises a detachable detector, wherein the detection device is moveable in the second sliding area.

12 Claims, 5 Drawing Sheets

ADJUSTABLE DETECTION APPARATUS

BACKGROUND OF THE INVENTION

1. Field of the Invention

The present invention relates to a detection apparatus, and more particularly to a detection apparatus set up in a cleaning tank, and is adjustable according to the size thereof.

2. Description of the Related Art

A complete semiconductor process includes many steps such as film deposition, lithography, and etching. Large quantities of materials and solutions are used for manufacturing or washing, while mostly water is used in a wet bench.

Acidic or chemical solvents such as $H_2SO_4$, HF and $H_3PO_4$ are the principal solutions used in etching or dissolving in semiconductor processes. Residue of acidic or chemical solvents easily remains on the wafer, which must then be thoroughly cleaned with large quantities of deionized water (DI water).

The chemical wet bench includes a cleaning tank, a cassette, and a megasonic device.

In FIG. 1, wafers 101 are vertically disposed in the cassette 102. The two wafers 101 are separated by a divider 102a. The wafers 101 are supported in an upright position by the divider 102a.

In FIG. 2, the cassette 102 and the wafers 101 are placed in a cleaning tank 105. The cleaning tank 105 has a bottom portion 104 provided with air holes 104a.

A megasonic device 106 comprises a megasonic tank 106a. Cleaning solution 107 is placed in the megasonic tank 106a. The megasonic device 106 is coupled beneath the cleaning tank 105.

The cleaning solution 107, at megasonic energy levels, is injected into the cleaning tank 105 through the air holes 104a of the bottom portion 104.

FIG. 3 shows a cleaning tank 105, in which the cassette 102 is placed and a megasonic device 106, which includes megasonic tank 106a containing DI water 107, coupled beneath the cleaning tank 105.

The DI water 107, at megasonic energy levels, is injected from megasonic tank 106a into the cleaning tank 105 via the air holes of the bottom portion 104 when the megasonic device 106 is turned on.

The cleaning tank 105 contains DI water 107 and the wafers 101. The cleaning tank 105 further comprises a discharging portion (not shown). Surplus DI water 107 is discharged by the discharging portion. Residue on the wafers 101 cannot be thoroughly removed if the megasonic device 106 provides insufficient megasonic energy due to damage.

There are several commercially available detectors to measure the megasonic energy levels of the DI water 107 in the cleaning tank 105. The detector is placed in the activated cleaning tank 105 in a predetermined position, and the megasonic energy levels of the DI water 107 in the cleaning tank 105 are directly measured by the detector. The detector can be, for example, a sound level meter.

Because commercially available detectors require manual operation and estimation of distance by the operator, error can result.

SUMMARY OF THE INVENTION

Accordingly, the object of the present invention is to provide a detection apparatus for a cleaning tank. The detection apparatus can be adjusted according to the dimensions of the cleaning tank. In addition, the detection apparatus can detect the megasonic energy levels in the cleaning tank in a predetermined position when the coordinate values of the position are set.

The present invention provides an adjustable detection apparatus comprising a first holding member, a second holding member, and a detection device. The first holding member has a first sliding area, and the second holding member is moveable in the first sliding area. The second holding member has a second sliding area, and the detection device is moveable in the second sliding area.

The present invention also provides an adjustable detection apparatus, for detecting the megasonic energy levels of the clean liquid in a cleaning tank, comprises a first holding member, a second holding member, and a detection device with a detachable detector. The first holding member has a first sliding area, and the second holding member is moveable in the first sliding area. The second holding member has a second sliding area, and the detection device is moveable in the second sliding area. The detachable detector can measure the megasonic energy levels of the clean liquid in the cleaning tank.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
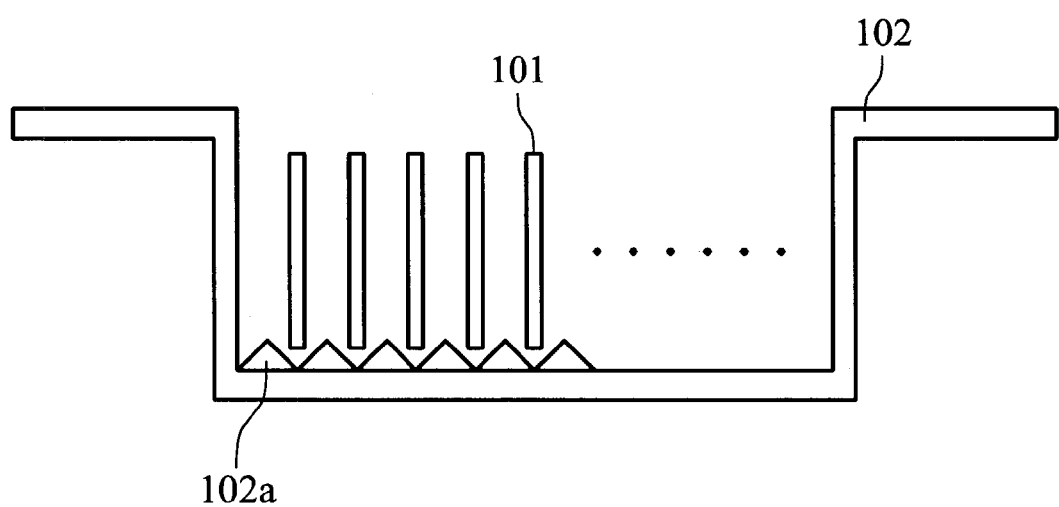
FIG. 1 is a cross section of a cassette of a conventional chemical wet bench.
Figure 2:
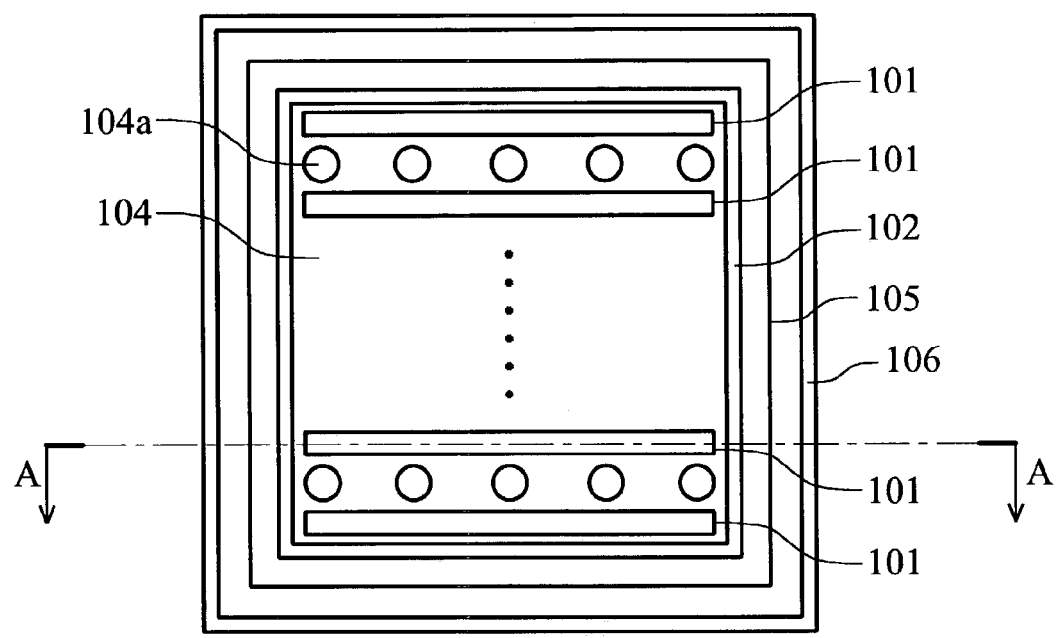
FIG. 2 is a top view of a conventional chemical cleaning machine in which a cassette is displaced.
Figure 3:
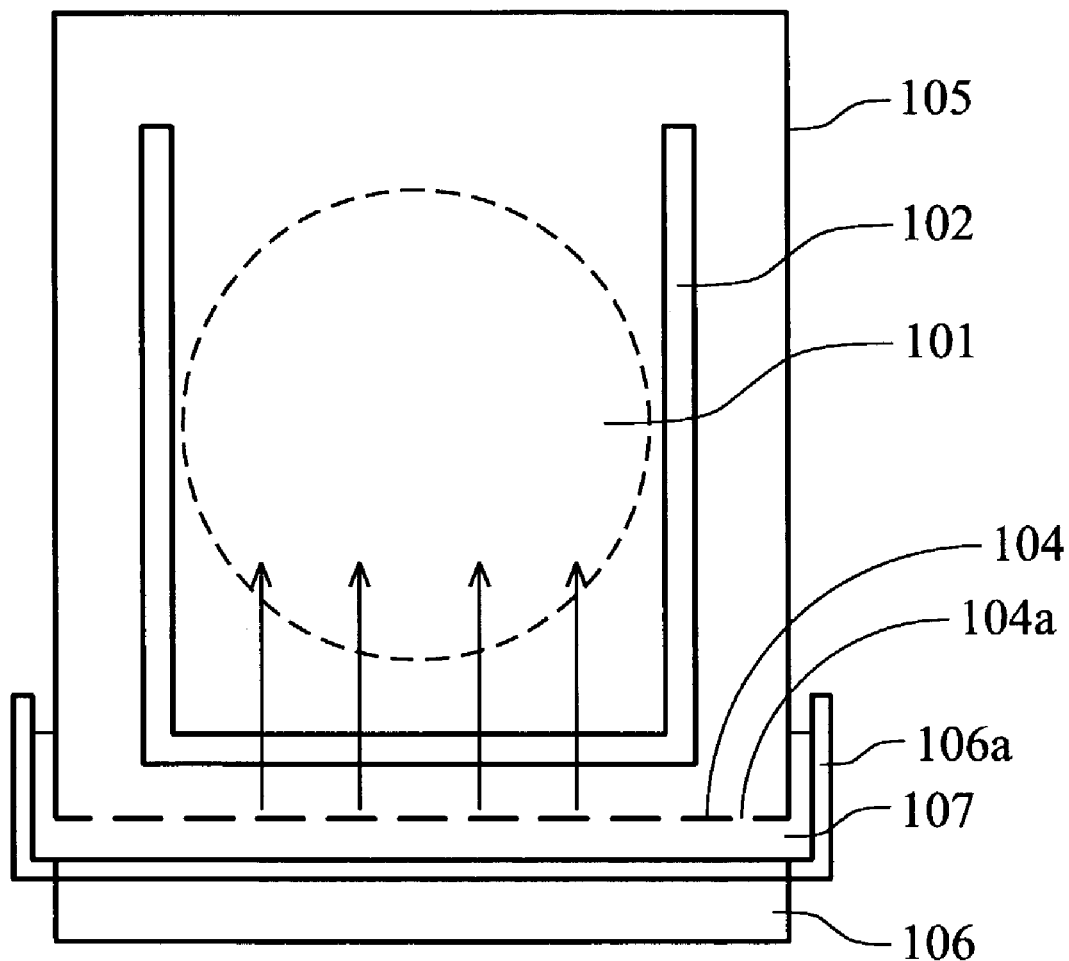
FIG. 3 is a cross section taken along lines A—A of FIG. 2.
Figure 4A:
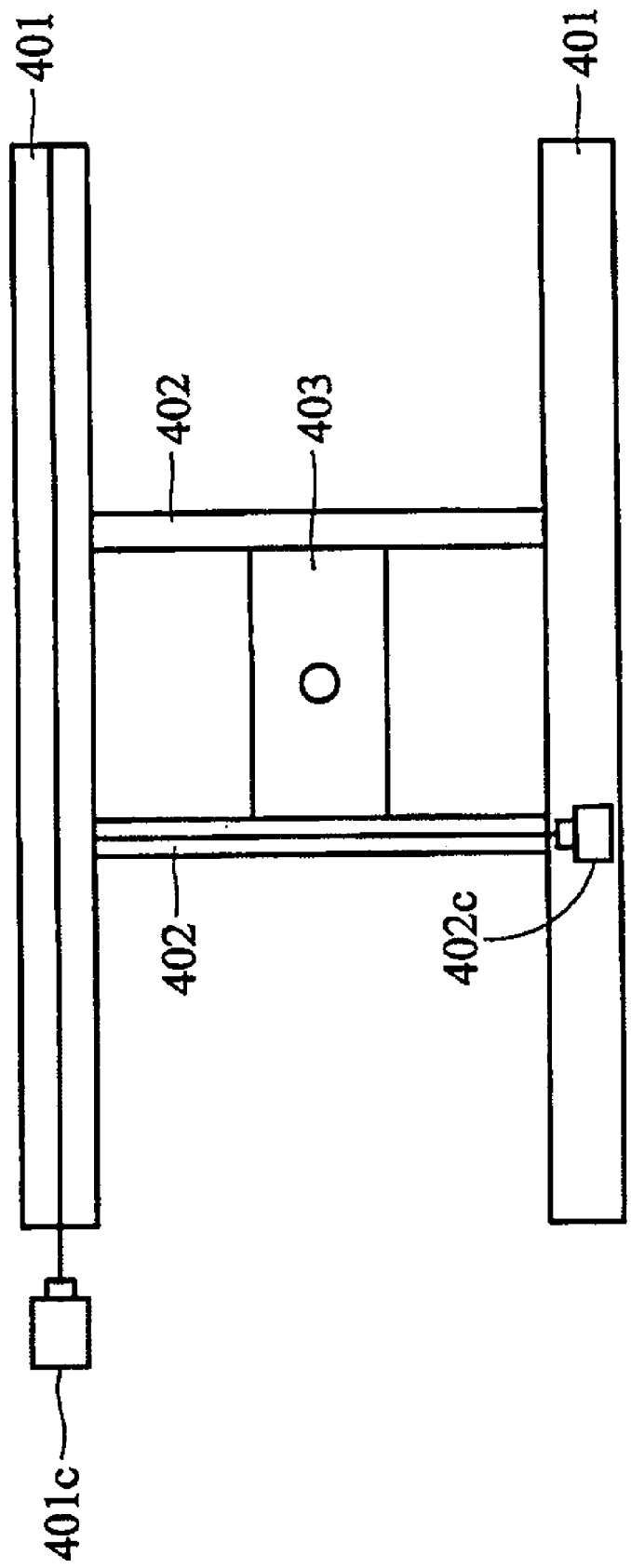
FIG. 4a shows an adjustable detection apparatus of the present invention.
Figure 4B:
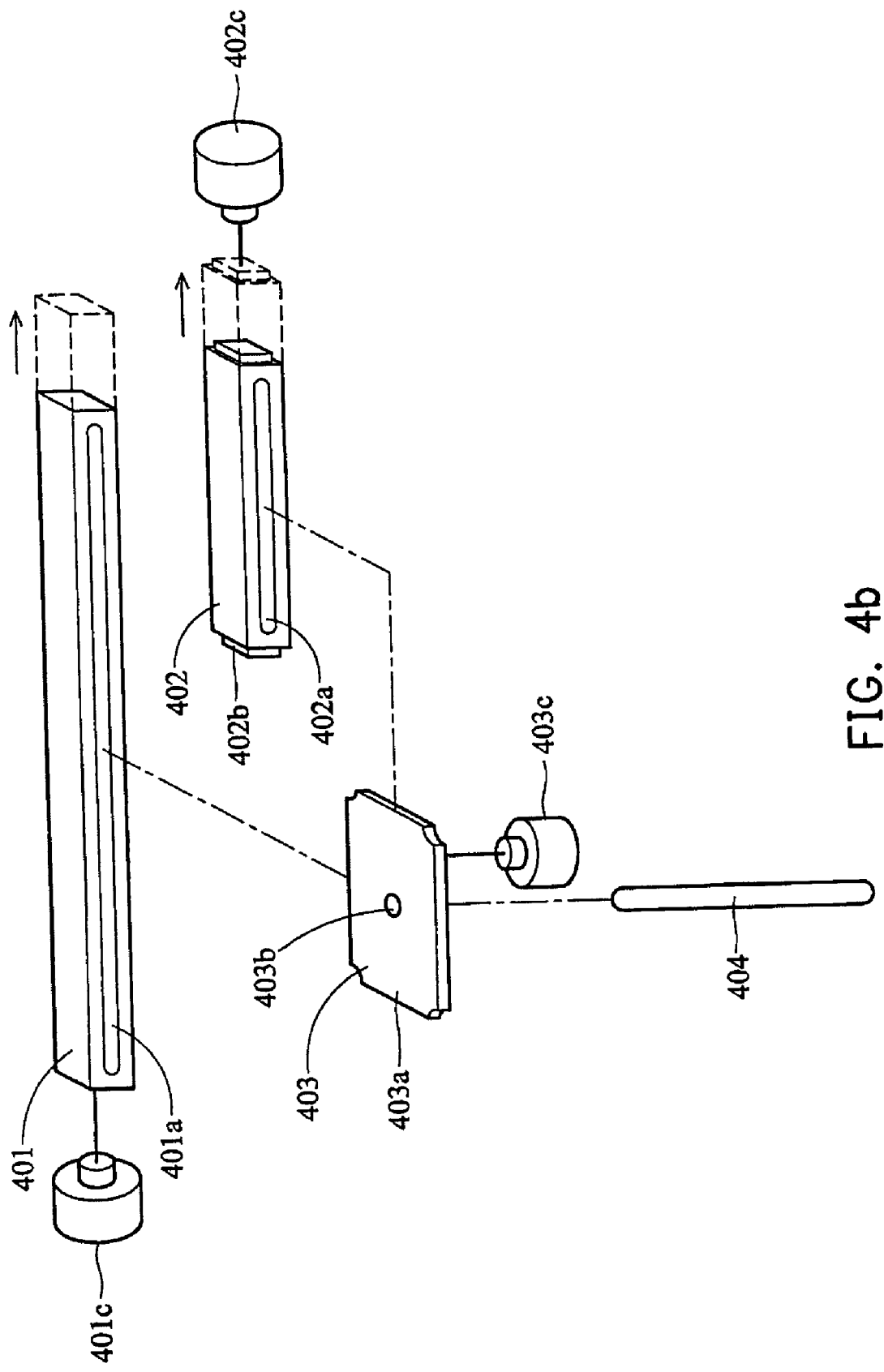
FIG. 4b is a perspective view of the adjustable detection apparatus of the present invention.

A detailed description of the adjustable detection apparatus of the present invention is given hereafter with reference to FIGS. 4a and 4b. FIG. 4a shows the adjustable detection apparatus of the present invention. FIG. 4b is a perspective view of the adjustable detection apparatus of the present invention.

The adjustable detection apparatus comprises first holding members 401, second holding members 402, and a detection device 403. The first holding members 401 are coupled to the second holding members 402. Running gears 401c and 402c are sequentially coupled to the first holding members 401 and the second holding members 402 and the detection device 403 to drive the detection device 403. The running gear 401c and 402c can, for example, be a stepping motor.

The adjustable detection apparatus can be used on a wafer cleaning tank. The first holding members 401 are adjustable according to the length of the cleaning tank, suitable for any size of cleaning tank.

The first holding members 401, parallel to each other, each have a sliding area 401a. The second holding members 402 sequentially have a sliding area 402a and a sliding member 402b. The second holding members 402 are parallel to each other, and the second holding member 402 and the first holding member 401 are perpendicular to one another. The detection device 403 has a sliding member 403a.

The second holding members 402 are adjustable according to the width of the cleaning tank. The sliding member 402a is positioned within the sliding area 401a, such that the holding members 402 are coupled to the holding members 401.

The sliding member 403a is positioned within the sliding area 402a, so that the detection device 403 is coupled to the second holding members 402.

The running gear coupled to the first holding members 401 is turned on to drive the second holding members 402, followed by the sliding member 402b moving in the sliding area 401a.

The running gear coupled to the second holding members 402 is turned on to drive the detection device 403, followed by the sliding member 403a moving in the sliding area 402a.

The detector 404 is fixed in the detection device 403 via a hole 403b thereof. The hole 403b is adjustable according to the diameter of the detector 404. After the detector 404 is fixed in the detection device 403 via the hole 403b, the running gear 403c, coupled to the detection device 403, is turned on to drive the detector 404 up or down. The detector 404 can be a commercially available sound level meter.

The detecting method applied to the megasonic cleaning tank of the present invention is herein described.

First, a value that indicates a coordinate is input. For example, the coordinate value can be (25, 17, and 4) or (25, 33, 4).

Next, the running gears 402c and 401c are turned on to sequentially drive the first holding members 401 and the second holding members 402 to the position indicated by the coordinate in the X-Y. For example, after the running 402c and 401c are turned on, the detection device 403 is driven to the position indicated by the coordinates (25, 17).

After that, the running gear coupled to the detection device 403 is turned on to drive the detector 404 on the Z-axis to arrive at the predetermined coordinates. For example, after the running gear 403c is turned on to drive the detector 404, the detector 404 is driven in the Z-direction to the position indicated by the coordinate (25, 17, and 4).

By this means, the detector 404 is moved into detecting position. The apparatus of the present invention can bring the detector to any predetermined position to perform detection. The results can then be compared to each other.

After detection is complete and the results of the detection are recorded, the running gears 402c and 401c are turned on again to drive the first holding members 401 and the second holding members 402 and the detection device 403 to the, next desired coordinates.

For example, if the next coordinate values are (25, 33, 4), the X-value of next position is the same number, but the Y-values of (25, 33, 4) and (25, 17, 4) are different. Thus the running gear 401c on the first holding member 401 that controls the movement of the detection apparatus in the Y-axis is turned on the second holding member 402 to Y=33 from Y=17. The Z-value of the next position is the same number as well, so the running gear 403c coupled to the detection device 403 is not turned on to drive the detector 404. Then, the megasonic energy levels of the position at coordinates (25, 33, and 4) are detected by the detector 404.

The adjustable detection apparatus detects the megasonic energy levels of the clean liquid, such as DI water or chemical solution, when wafers are being cleaned, so real-time detecting results of the clean liquid are recorded.

The adjustable detection apparatus can detect the megasonic energy levels of the clean liquid at any position in the cleaning tank. The position of the cleaning tank can be selected by any controlling apparatus or user.

The adjustable detection apparatus of the present invention is not limited to detection of the megasonic energy levels of the clean liquid of the cleaning tank, and can be used in any suitable device. Furthermore, other types of detection can be performed in the cleaning tank.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adjustable detection apparatus, comprising:
a first holding member having a first sliding area;
a second holding member, having a second sliding area, disposed on the first holding member to be moveable in the first sliding area, wherein the second holding member is perpendicular to the first holding member; and
a detection device, having a detachable detector, disposed on the second holding member to be moveable in the second sliding area, wherein the detachable detector detects megasonic energy levels of a clean liquid.

2. The adjustable detection apparatus according to claim 1, wherein the first holding member further comprises a running gear coupled to the first holding member.

3. The adjustable detection apparatus according to claim 2, wherein the running gear is a stepping motor.

4. The adjustable detection apparatus according to claim 1, wherein the second holding member further comprises a running gear coupled to the second holding member.

5. The adjustable detection apparatus according to claim 4, wherein the running gear is a stepping motor.

6. The adjustable detection apparatus according to claim 1, wherein the detection device further comprises a running gear coupled to the detection device.

7. The adjustable detection apparatus according to claim 6, wherein the running gear comprises a stepper motor.

8. The adjustable detection apparatus according to claim 1, wherein the clean liquid comprises DI water or chemical solution.

9. An adjustable detection apparatus, comprising:
a first holding member having a first sliding area;
a second holding member, having a second sliding area, disposed on the first holding member to be moveable in the first sliding area, wherein the second holding member is perpendicular to the first holding member; and
a detection device, having a detachable detector, disposed on the second holding member to be moveable in the second sliding area, wherein the detachable detector is a sound level meter to detect sonic energy levels.

10. An adjustable detection apparatus, comprising:
a first holding member having a first sliding area;
a second holding member, having a second sliding area, disposed on the first holding member to be moveable in the first sliding area, wherein the second holding member is perpendicular to the first holding member; and
a detection device, having a detachable detector, disposed on the second holding member to be moveable in the second sliding area, wherein the first holding member is adjustable so as to adjust the distance the second holding member is moveable in the first sliding area along a first axis.

11. The adjustable detection apparatus according to claim 10, wherein the second holding member is adjustable so as to adjust the distance the detection device is moveable in the second sliding area along a second axis.

12. The adjustable detection apparatus according to claim 11, wherein the first axis is perpendicular to the second axis.

* * * * *